(12) United States Patent
Corpolongo (10) Patent No.: US 10,106,982 B2
(45) Date of Patent: Oct. 23, 2018

(54) HIGH STRENGTH GRID MEMBER FOR SUSPENDED CEILINGS

(71) Applicant: Rockwool International A/S, Hedehusene (DK)

(72) Inventor: Michael Corpolongo, Chicago, IL (US)

(73) Assignee: Rockwool International A/S, Hedehusene (DK)

( * ) Notice: Subject to any disclaimer, the term of this patent is extended or adjusted under 35 U.S.C. 154(b) by 0 days.

(21) Appl. No.: 15/457,350

(22) Filed: Mar. 13, 2017

(65) Prior Publication Data

US 2018/0258639 A1   Sep. 13, 2018

(51) Int. Cl.
| | | |
|---|---|---|
| *E04B 9/14* | (2006.01) | |
| *E04B 9/16* | (2006.01) | |
| *E04B 9/06* | (2006.01) | |
| *F16B 7/04* | (2006.01) | |
| *F16B 2/10* | (2006.01) | |
| *F16B 7/18* | (2006.01) | |

(52) U.S. Cl.
CPC ................ *E04B 9/067* (2013.01); *F16B 2/10* (2013.01); *F16B 7/0433* (2013.01); *F16B 7/18* (2013.01); *E04B 9/068* (2013.01); *E04B 9/14* (2013.01); *E04B 9/16* (2013.01)

(58) Field of Classification Search
CPC ..... E04C 3/02; E04C 3/08; E04C 3/09; E04C 3/04; E04C 2003/0404; E04C 2003/0408; E04C 2003/0413; E04C 2003/0443; E04C 2003/0452; E04C 2003/0456; E04C 2003/046; E04C 2003/0486; E04C 2003/0491; E04B 9/067; E04B 9/068; E04B 9/10; E04B 9/14; E04B 9/16
See application file for complete search history.

(56) References Cited

U.S. PATENT DOCUMENTS

| | | | |
|---|---|---|---|
| 2,689,630 A | 9/1954 | Drury | |
| 3,284,977 A | 11/1966 | Lickliter et al. | |
| 4,191,352 A | 3/1980 | Schuplin | |
| 4,479,341 A | 10/1984 | Schuplin | |
| 4,723,749 A | 2/1988 | Carraro et al. | |
| 4,905,952 A | 3/1990 | Pinquist | |
| 5,195,289 A | 3/1993 | LaLonde et al. | |
| 5,201,787 A | 4/1993 | LaLonde et al. | |
| 5,611,185 A | 3/1997 | Wilz | |
| 5,822,941 A | 10/1998 | Kinsella | |
| 5,927,037 A | 7/1999 | Kinsella | |
| 6,131,362 A * | 10/2000 | Buecker | E04B 5/10 29/897.35 |
| 6,205,733 B1 | 3/2001 | LaLonde | |
| 7,392,629 B1 | 7/2008 | Bankston et al. | |

(Continued)

FOREIGN PATENT DOCUMENTS

| | | |
|---|---|---|
| CA | 1104316 A | 7/1981 |
| CA | 1181216 A | 1/1985 |

(Continued)

*Primary Examiner* — Phi D A
(74) *Attorney, Agent, or Firm* — Cook Alex Ltd.

(57) ABSTRACT

A high-strength grid member is provided that comprises two standard Tee-shaped grid members that are vertically aligned to form an I-beam configuration with the strengthening bulbs of each being spaced apart. A plurality of clips is secured to the spaced-apart bulbs by means of fasteners to secure the two grid members together.

9 Claims, 8 Drawing Sheets

(56) References Cited

U.S. PATENT DOCUMENTS

| | | |
|---|---|---|
| 7,478,787 B2 | 1/2009 | Bankston et al. |
| 7,552,567 B2 | 6/2009 | Ingratta et al. |
| 7,578,107 B2 | 8/2009 | Platt |
| 7,614,195 B2 | 11/2009 | Platt et al. |
| 7,770,349 B2 | 8/2010 | Tedesco et al. |
| 8,209,931 B2 | 7/2012 | Sareyka |
| 8,336,843 B2 | 12/2012 | Gulbrandsen et al. |
| 8,397,462 B2 | 3/2013 | Gulbrandsen et al. |
| 8,485,835 B2 | 7/2013 | Liang et al. |
| 9,151,050 B2 | 10/2015 | Santeramo |
| D769,706 S | 10/2016 | Jankovec et al. |
| 2002/0157332 A1 | 10/2002 | Ziegler et al. |
| 2009/0293403 A1 | 12/2009 | Cedrone et al. |
| 2010/0229501 A1* | 9/2010 | Bodnar ............ E04C 3/09 52/846 |
| 2010/0257807 A1 | 10/2010 | Raheel et al. |
| 2013/0167465 A1 | 7/2013 | Santeramo |
| 2014/0260083 A1* | 9/2014 | Zhang .......... F16B 37/0885 52/843 |
| 2014/0352249 A1 | 12/2014 | Jankovec et al. |
| 2015/0315787 A1* | 11/2015 | Swenters ............ E04C 3/08 52/633 |

FOREIGN PATENT DOCUMENTS

| | | |
|---|---|---|
| CA | 1191318 A | 8/1985 |
| CA | 2069837 C | 12/1992 |
| CA | 2147280 A1 | 4/1994 |
| CA | 2373235 A1 | 8/2002 |
| CA | 2518294 C | 3/2006 |
| CA | 2606845 C | 12/2006 |
| CA | 2645824 C | 11/2007 |
| CA | 2746404 A1 | 11/2007 |
| CA | 2672419 C | 7/2008 |
| CA | 2730283 C | 1/2010 |
| CA | 2744467 A1 | 6/2010 |
| CA | 2836237 A1 | 12/2012 |
| CA | 2838361 C | 11/2014 |
| EP | 0516330 B1 | 8/1998 |
| EP | 0667929 B1 | 9/2000 |
| EP | 1236837 B1 | 4/2005 |
| EP | 1885566 B1 | 10/2010 |
| EP | 2556200 B1 | 7/2014 |
| WO | WO9409222 A1 | 4/1994 |
| WO | WO2004005641 A1 | 1/2004 |
| WO | WO2006132715 A2 | 12/2006 |
| WO | WO2007131351 A1 | 11/2007 |
| WO | WO2008082868 A2 | 7/2008 |
| WO | WO2010008916 A2 | 1/2010 |
| WO | WO2010062511 A2 | 6/2010 |
| WO | WO2010117517 A2 | 10/2010 |
| WO | WO2012166283 A1 | 12/2012 |
| WO | WO2014193486 A1 | 12/2014 |
| WO | WO2015145245 A1 | 10/2015 |

* cited by examiner

HIGH STRENGTH GRID MEMBER FOR SUSPENDED CEILINGS

FIELD OF THE DISCLOSURE

The present application relates to suspended ceiling grid systems and, more particularly, to a high strength beam that may be incorporated into a grid system of standard grid components.

BACKGROUND

In a typical suspended ceiling, a grid of metal beams for supporting ceiling panels and lighting fixtures is assembled and supported by hanger wires tied into an upper structural ceiling. However, there are situations where the plenum between the grid and the structural ceiling is occupied by structures such as air ducts for HVAC, electrical conduits, water lines and the like, where hanger wires cannot be easily used to support the grid.

In such situations, standard Tee-shaped grid members may not have a sufficient moment of inertia to resist bending under load in the absence of hanger wires or other means of support being secured to the grid member intermediate its ends.

By way of the invention described herein, a high-strength beam for a suspended ceiling grid system is provided that is constructed of standard Tee-shaped grid members and which exhibits a sufficient resistance to bending that it may be used in grid systems without needing to be supported intermediate its ends.

SUMMARY

A beam for a suspended ceiling grid system is provided that comprises first and second suspended ceiling grid runners in spaced-apart vertical relationship. Each grid runner has a reinforcing bulb, with the reinforcing bulb being connected by an intermediate web to laterally-extending flanges configured to support the edges of ceiling panels associated with the grid system.

In one aspect of the invention, the first and second grid runners are positioned in generally vertical, spaced-apart alignment, with the reinforcing bulb of the first grid runner adjacent the reinforcing bulb of the second grid runner, thus approximating in appearance an I-beam. The reinforcing bulbs define an open space between the first and second grid runners, and at least one clip (and preferably at least two clips) is provided for connecting the first grid runner to the second grid runner in spaced apart relationship.

In keeping with another aspect of the invention, the clip comprises first and second planar portions that lie in parallel planes that are spaced apart a distance corresponding to the width of the bulb of the grid runner. The clip includes a third planar portion that has a width corresponding to the open space between the reinforcing bulbs of the grid runners. The third planar portion connects the first and second planar portions to each other. The third planar portion is aligned along a central axis defined by the first and second planar portions, and is formed at an oblique angle with respect to both the first and second planar portions.

The first and second planar portions of the clip each have a width equal to twice the height of the reinforcing bulb of the grid runners plus the width of the third planar portion. The first and second planar portions further have raised upper and lower edges configured to engage and locate the reinforcing bulbs of the grid runners relative to the clip.

Each of the first and second planar portions includes apertures configured to receive fasteners for securing each of the first and second planar portions to the first and second grid runners.

BRIEF DESCRIPTION OF THE DRAWINGS

FIG. 17 is a perspective view similar to FIG. 16 also showing the plenum above the grid occupied by structures such as air ducts for HVAC, electrical conduits, water lines and the like.

DETAILED DESCRIPTION

A more detailed description of a high-strength I-beam grid member in accordance with the present disclosure is set forth below. It should be understood that the description of a specific embodiment is intended to be exemplary, and not exhaustive of all possible variations or applications. Thus, the scope of the disclosure is not intended to be limiting, and should be understood to encompass variations or embodiments that would occur to persons of ordinary skill.

Figure 1:
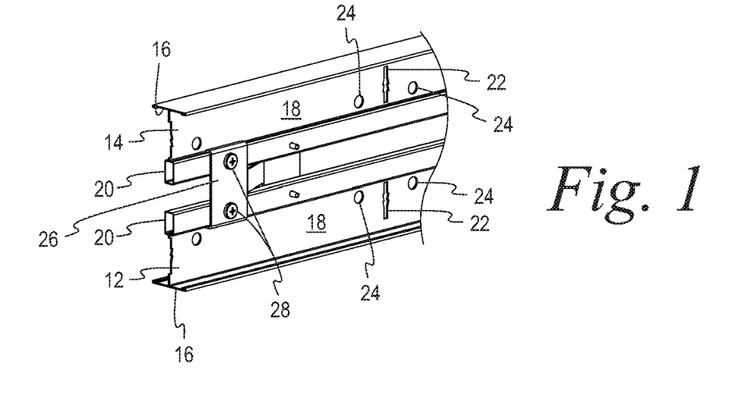
FIG. 1 is a perspective view of an I-beam for a suspended ceiling grid system assembled from two standard grid runners in accordance with the present disclosure.
Figure 2:
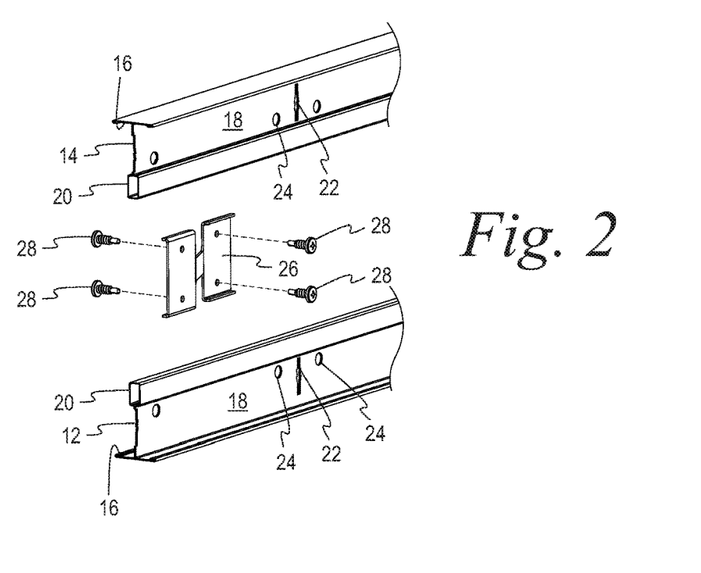
FIG. 2 is an exploded perspective view of the I-beam of FIG. 1.
Figure 7:
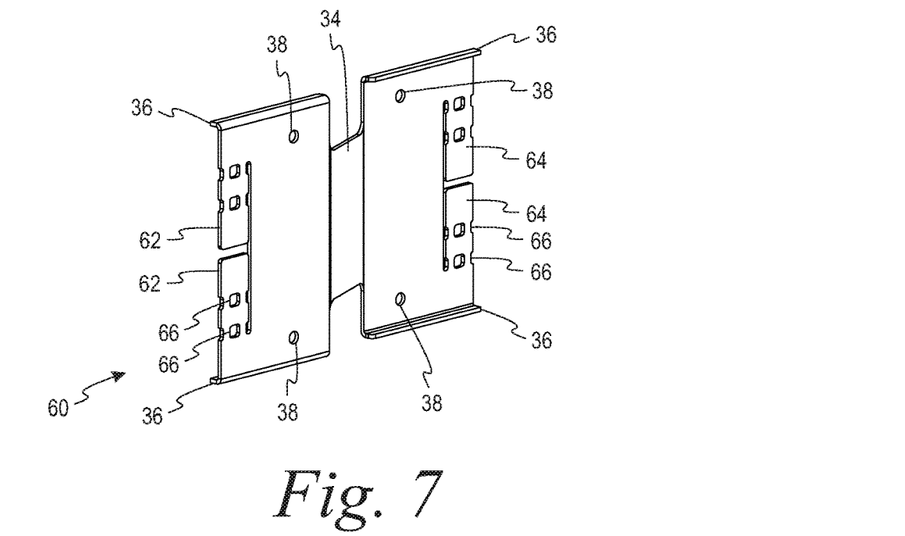
FIG. 7 is a perspective view of a second embodiment of a clip for securing first and second grid runners together in an I-beam configuration.
Figure 8:
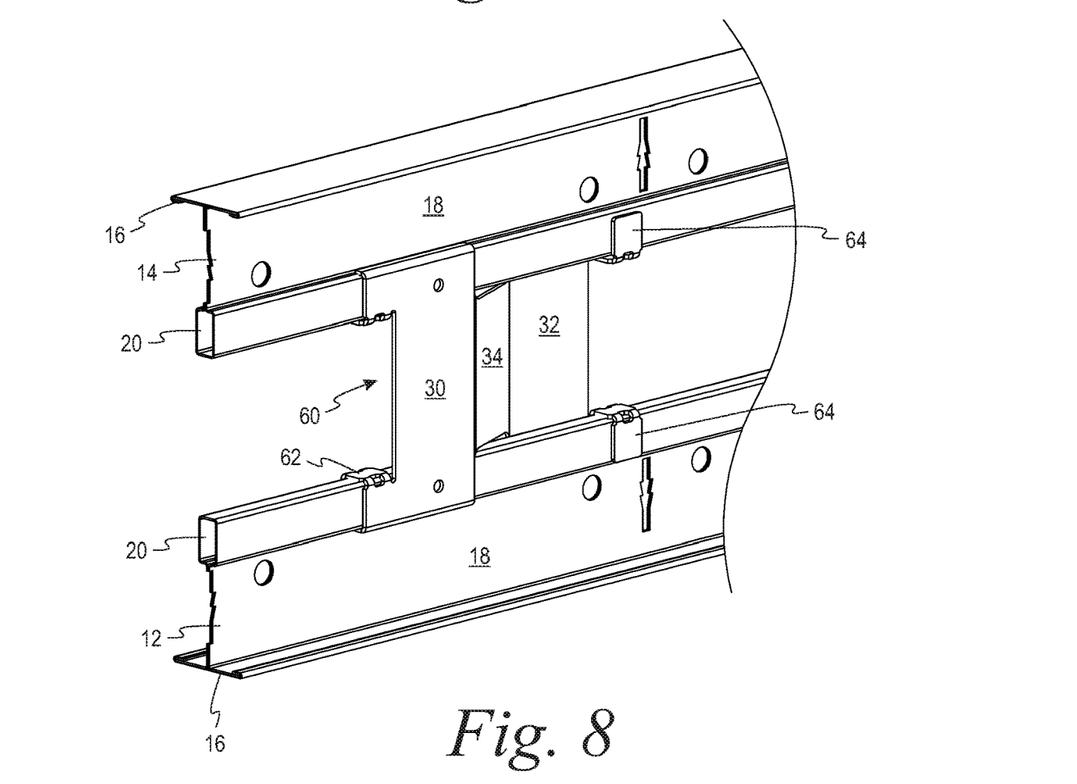
FIG. 8 is a perspective view of an I-beam configuration using the clip of FIG. 7.
Figure 9A:
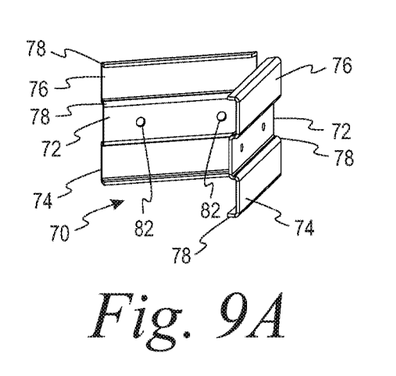
FIGS. 9A and 9B are perspective views of a third embodiment of a clip for securing first and second grid runners together in an I-beam configuration.
Figure 9B:
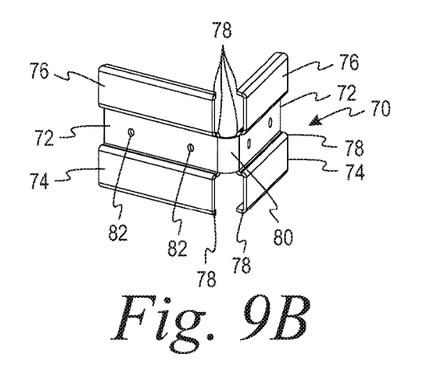

Turning to FIGS. 1 and 2, there is seen a high-strength grid member, generally designated 10, comprised of two standard Tee-shaped grid members 12, 14. As is well known, each Tee-shaped grid member comprises opposed flanges 16 joined by an intermediate web 18 to a strengthening bulb 20. The webs 18 are formed with regularly-spaced slots 22 and apertures 24 for receiving, e.g., connectors of cross tees that are used in combination with a plurality of grid members 10 to form a grid system (such as shown in FIGS. 7-9).

Figure 3:
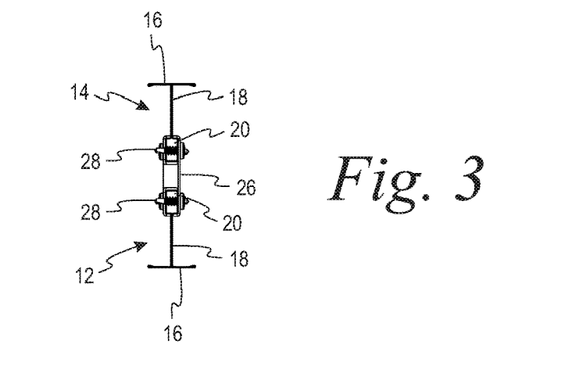
FIG. 3 is an end view of the I-beam of FIG. 1.

The grid members 12, 14 are vertically aligned to form an I-beam configuration (best appreciated with reference to FIG. 3), with the strengthening bulbs 18 of each being spaced apart. A plurality of clips 26, described in greater detail below, are secured to the spaced-apart bulbs 18 by means of fasteners 28, such as self-tapping sheet metal screws, to secure the first grid member 12 to the second grid member 14.

Figure 4:
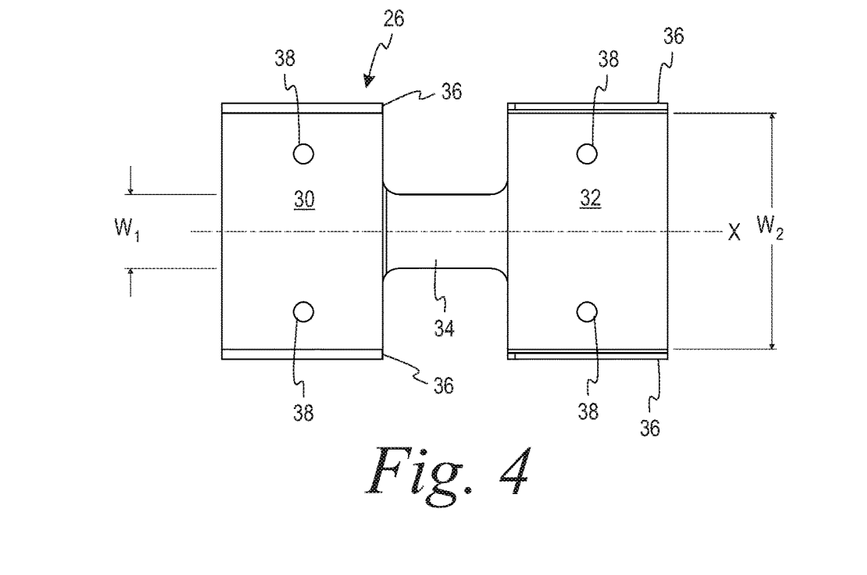
FIG. 4 is an elevation view of a clip for use in assembling the I-beam of FIG. 1.
Figure 5:
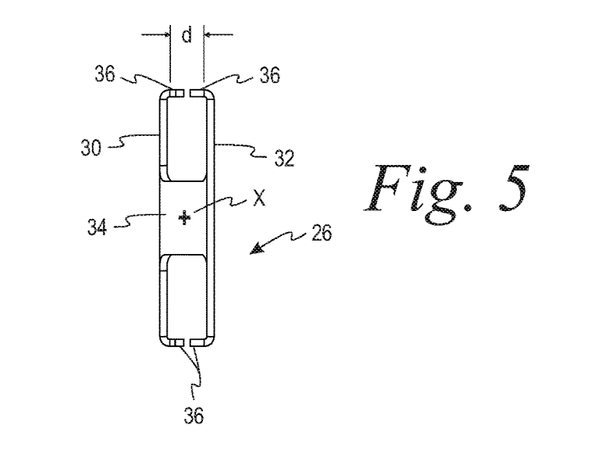
FIG. 5 is an end view of the clip taken from the right side of FIG. 4.
Figure 6:
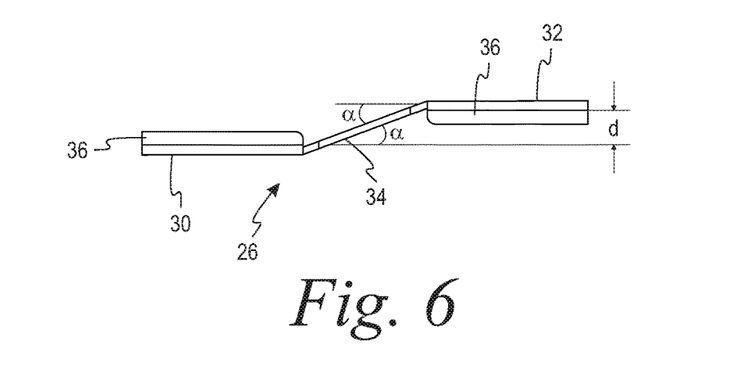
FIG. 6 is a top view of the clip of FIG. 4.

More specifically, and with reference to FIGS. 4-6, each clip 26 comprises first and second planar portions 30, 32 that lie in parallel planes that are spaced apart a distance "d" corresponding generally to the width of the strengthening bulbs 18 of the grid members 12, 14, which is typically on the order of approximately 0.25 inches. The clip 26 includes a third planar portion 34 that has a width "$w_1$" that defines the open space between the reinforcing bulbs 18 of the grid runners 12, 14 when they are combined to form the I-beam. The third planar portion 34 connects the first and second planar portions 30, 32 to each other, is aligned along a central axis "X" defined by the first and second planar portions 30, 32, and is formed at an oblique angle "α" with respect to both the first and second planar portions. By way of example, α may be approximately 21°.

The first and second planar portions 30, 32 of the clip each have a width "$w_2$" equal to twice the height of the reinforcing bulb 18 of the grid runners plus the width "$w_1$" of the third planar portion 34. By way of example, $w_2$ may be approximately 1.5 inches. The first and second planar portions of the clip further have raised upper and lower edges 36 configured to engage edge of the reinforcing bulb 18 where it joins with the web 20 of its respective grid runner 12 or 14. By way of example, the edges may extend approximately 0.1 inch perpendicularly to the face of their respective planar portions.

Each of the first and second planar portions 30, 32 also includes apertures 38 configured to receive the fasteners 28 for securing each of the first and second planar portions 30, 32 to the reinforcing bulbs 18 of both grid runners 12, 14.

Alternate embodiments of the clip 26 may be provided. Turning to FIGS. 7 and 8, a first alternate embodiment of a clip 60 is shown. The clip 60 is similar to clip 26, described above. However, the first and second planar portions 30, 32 of the clip further include a pair of opposed tabs 62, 64 on the free edge extending between the upper and lower edges 36. The tabs 62, 64 are configured to be bendable, so as to engage the reinforcing bulb 20 of the associated grid runner 12 or 14, as best seen in FIG. 8. The tabs 62, 64 are formed with relieved areas, such as cut-outs 66, to facilitate their bending at the desired location.

Figure 10:
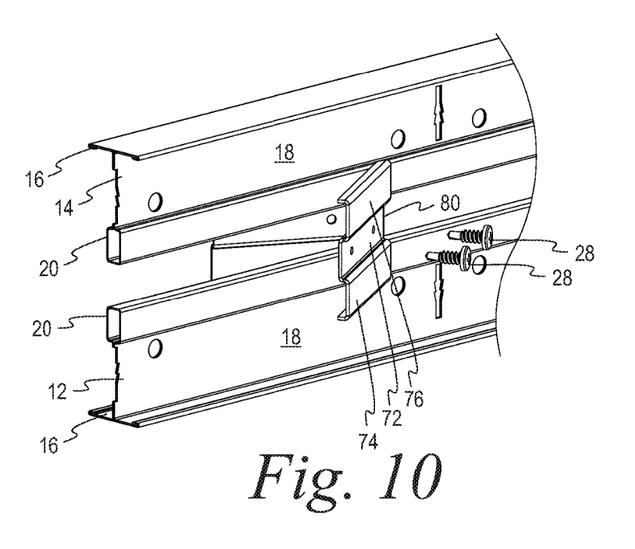
FIG. 10 is a perspective view illustrating the assembly of an I-beam configuration using the clip of FIGS. 9A and 9B.
Figure 11:
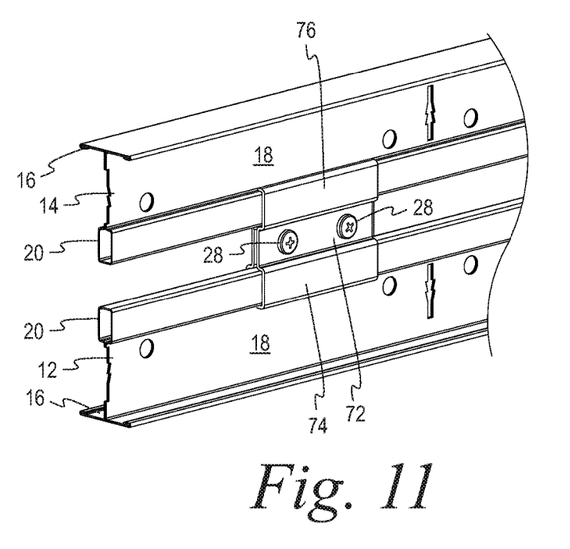
FIG. 11 is a perspective view of an I-beam configuration using the clip of FIGS. 9A and 9B.

With reference to FIGS. 9-11, a second alternate embodiment of a clip 70 is shown. In this embodiment, clip 70 comprises an intermediate portion 72 that is sized in width to define the space between the reinforcing bulbs 20 of the first and second grid runners 12, 14. Upper and lower portions 74, 76 extend from the intermediate portion 72 that include raised edges 78 configured to engage the reinforcing bulbs 20 of the first and second grid runners 12, 14. The clip 70 is further configured to be bendable about a central portion 80 to bring the upper and lower portions 76, 74 into engagement with the reinforcing bulbs 20, as shown in FIGS. 10 and 11. A plurality of apertures 82 configured to receive fasteners 28 is provided for securing the clip 70 to the first and second grid runners 12, 14.

Figure 12:
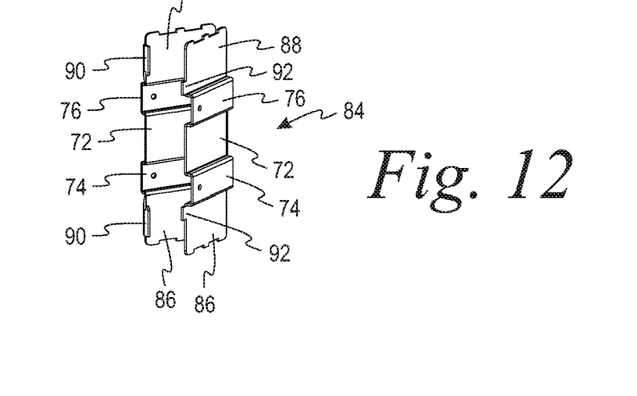
FIG. 12 is a perspective view of a third embodiment of a clip for securing first and second grid runners together in an I-beam configuration.
Figure 13:
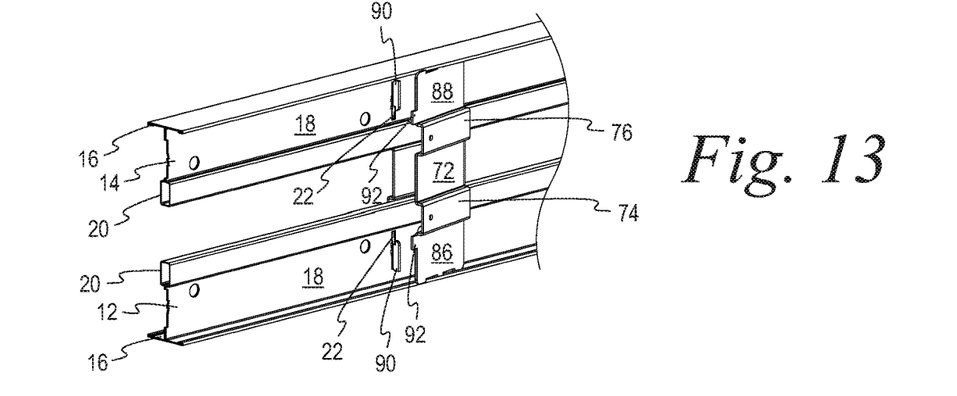
FIG. 13 is a perspective view illustrating the assembly of an I-beam configuration using the clip of FIG. 12.
Figure 14:
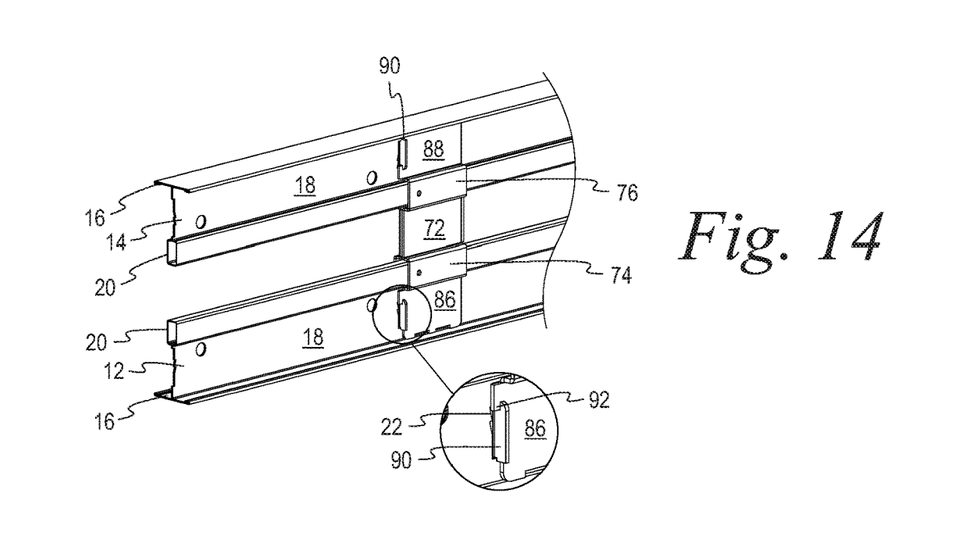
FIG. 14 is a perspective view of an I-beam configuration using the clip of FIG. 12.

FIGS. 12-14 depict a third alternate embodiment of a clip 84 similar to the bendable clip 70 shown in FIGS. 9-11. Each of the lower and upper portions 74, 76 of the clip 84 further includes an extension 86, 88 configured to lie along the intermediate web 18 of the respective first and second grid runners 12, 14. The extensions 86, 88 include interlocking tabs 90, 92 configured to cooperate with slots 22 formed in the intermediate webs 18 of the first and second grid runners 12, 14 to secure the clip 84 thereto.

In light of the above, a high strength beam for use in a suspended ceiling grid system may be assembled by placing a first grid runner and a second grid runner in an aligned, vertical relationship in which the reinforcing bulb of the first grid runner is adjacent to the reinforcing bulb of the second grid runner and the intermediate webs of the grid runners are substantially co-planar. Preferably, the reinforcing bulbs of the two grid runners are spaced apart. Then, one or more clips are secured to one or both of the intermediate web and reinforcing bulbs of the two grid runners to maintain the two grid runners in the aligned, vertical relationship, so that the assembled grid members have an I-beam cross section. Preferably, the clips are secured to the grid runners by fasteners, such as screws.

A high strength grid member as described above provides many advantages over standard Tee-shaped grid members. The high-strength runner can be run over longer spans with fewer hanger wires. Such a high strength runner is particularly advantageous for use in corridors, where the width can be spanned with a single high-strength runner that is supported on its ends with no hanger wires, thus providing for faster installation and fewer obstructions in the plenum above the grid.

Further, because the high strength grid described herein is made of standard Tee-shaped grid members, it can easily and quickly be assembled on-site, from readily available grid components that are already on-hand, without any special tools required for assembly. Because the clips do not block the slotting features of the grid runners in the assembled high strength runner, it can be easily integrated into standard grid systems to form hybrid suspension grids, thus permitting an installer to customize the suspension on-site grid to provide the higher strength only where required (so as to, e.g., accommodate specific areas where hanger wires cannot be conveniently used due to obstructions in the plenum).

Figure 15:
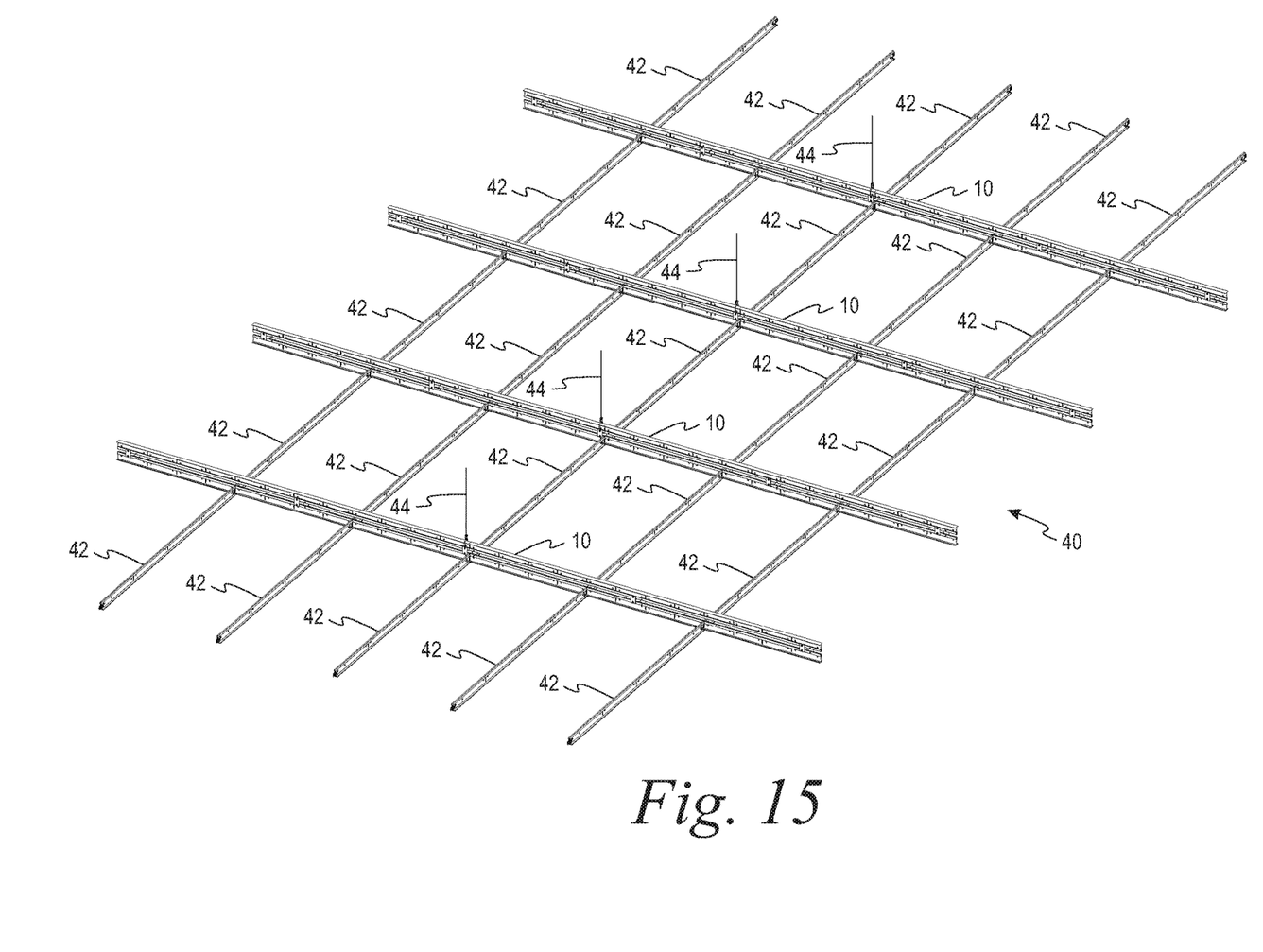
FIG. 15 is a perspective view of a grid system using I-beam grid members as shown in FIG. 1 in combination with standard cross tee members.
Figure 16:
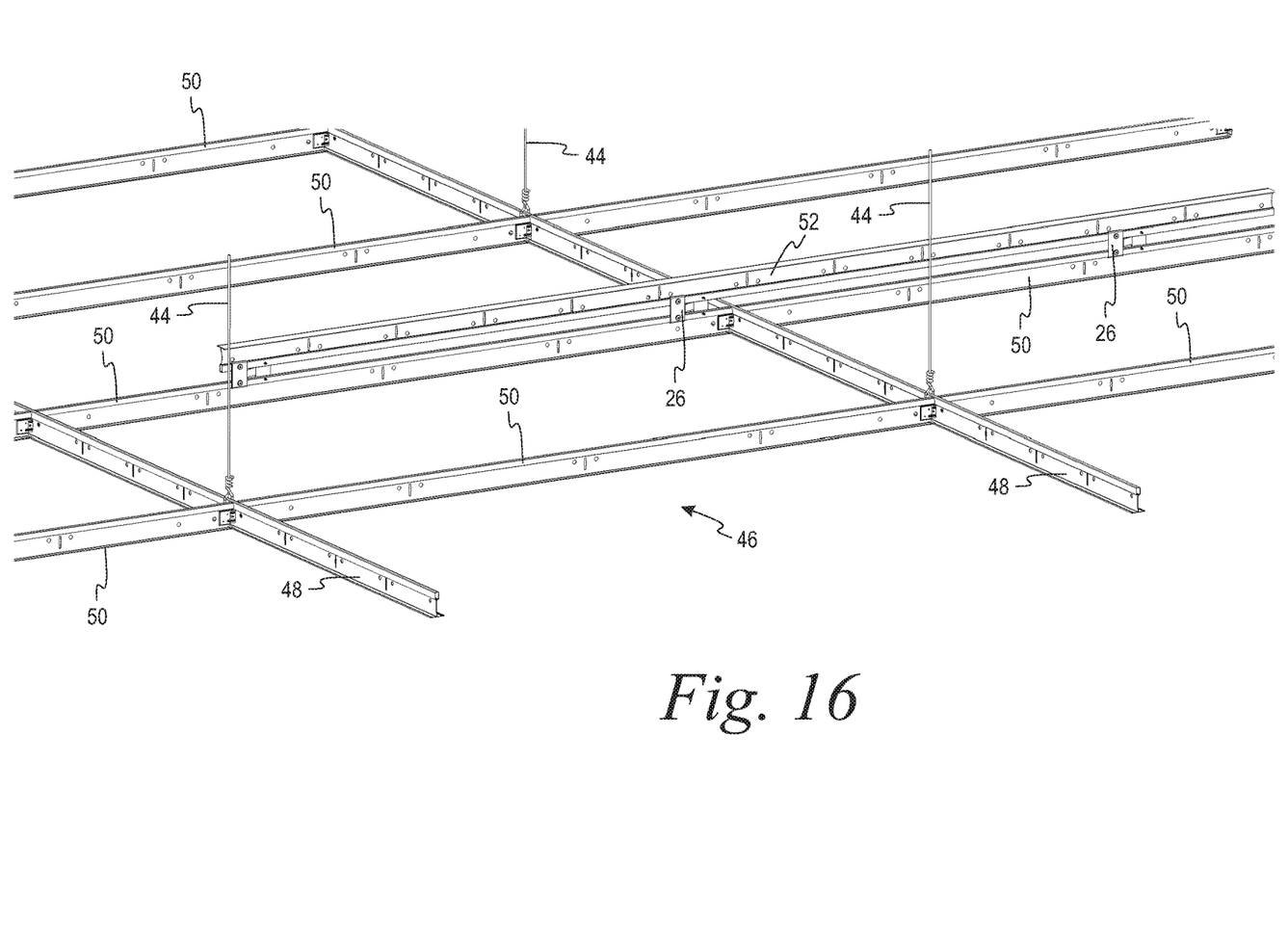
FIG. 16 is a perspective view of a grid system using I-beam grid members as shown in FIG. 1 in combination with standard main runners and cross tees.
Figure 17:
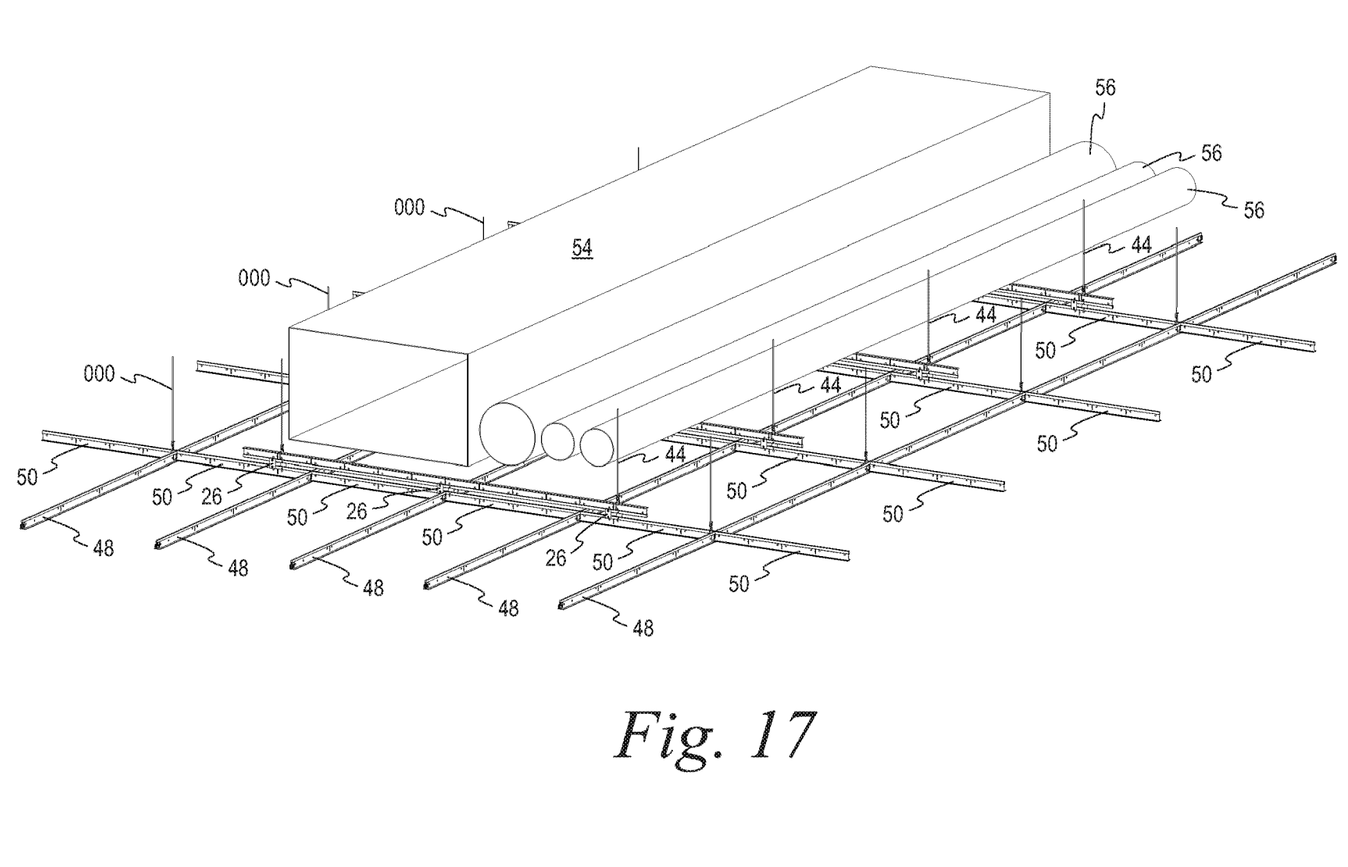

With reference to FIGS. 15-17, several suspension grid systems utilizing high strength grid runners 10 as described above are shown. With reference to FIG. 15, a grid system 40 that could be used in, e.g., a corridor, is shown. The system 40 employs four high-strength grid runners 10 (typically 12 feet in length) that span the width of the corridor, with cross tees 42 running between adjacent high strength runners, the connectors on the ends of the cross tees 42 being received in the slots 22 of the lower Tee-shaped grid member 12 of the high strength runner. Each high strength runner is supported with a single hanger wire 44 located mid-span, where three hanger wires would typically be required with standard grid members. The ends of the high strength runners 10 are supported by or secured to the walls of the corridor by perimeter trim members (not shown) that are well known in the art.

FIG. 16 shows a portion of a suspension grid system 46 utilizing a plurality of standard Tee-shaped main runners 48, with cross tees 50 that span between adjacent main runners 48, in which a central portion of the grid system 46 is reinforced by securing a second standard Tee-shaped main runner 52 to the grid with three clips 26 to reinforce the grid in an area where two cross tees intersect and connect to a main runner. Thus, the grid system 46 can be suspended from a series of hanger wires 54, but not require a hanger wire in the area where the second main runner 52 is secured to the grid system. FIG. 17 is similar to FIG. 16, but shows a series of main runners 52 that are secured to the grid to reinforce the grid in an area where ductwork 54 and conduit 56 are located in the plenum so that hanger wires cannot be attached to the grid in the reinforced area.

Thus, a high-strength beam for a suspended ceiling grid system is provided that is constructed of standard Tee-shaped grid members and a plurality of specially-designed clips. The resultant beam exhibits a sufficient resistance to bending that it may be used in grid systems without needing to be supported intermediate its ends. While certain specific embodiments have been shown and described, there Is no intent to limit the invention to the same, but is instead intended to be defined by the scope of the following claims.

The invention claimed is:

1. A high strength beam for a suspended ceiling grid system comprising:
   a) first and second suspended ceiling grid runners in spaced-apart vertical relationship, each grid runner having a reinforcing bulb having a height and a width, the reinforcing bulb being connected by an intermediate web to laterally-extending flanges so as to define a Tee shape, the first and second grid runners being positioned such that the reinforcing bulb of the first grid runner is adjacent to, but spaced apart from, the reinforcing bulb of the second grid runner;
   b) at least one clip for connecting the first grid runner o the second grid runner; and
   c) fasteners securing each clip to the first and second grid runners.

2. The beam of claim 1 wherein each clip comprises: i) first and second planar portions lying in spaced-apart parallel planes; ii) a third planar portion having a width connecting the first and second planar portions to each other; iii) the first and second planar portions each having a width equal to twice the height of the reinforcing bulb of the grid runners plus the width of the third planar portion; iv) the first and second planar portions having raised upper and lower edges configured to engage and locate the reinforcing bulbs of the grid runners relative to the clip; and v) apertures located in each of the first and second planar portions configured to receive fasteners for securing each of the first and second planar portions to the reinforcing bulbs of both grid runners.

3. The beam of claim 2 wherein the first and second planar portions of each clip are spaced apart a distance corresponding to the width of the reinforcing bulb.

4. The beam of claim 2 wherein the third planar portion of each clip has a width corresponding to the space between the reinforcing bulbs of the grid runners.

5. The beam of claim 2 wherein the third planar portion of each clip is aligned along a central axis defined by the first and second planar portions.

6. The beam of claim 2 wherein the third planar portion of each clip is formed at an oblique angle with respect to both the first and second planar portions.

7. The beam of claim 2 wherein each clip further comprises the first and second planar portions each having a free edge extending between the upper and lower edges, each of the free edges comprising a pair of opposed tabs configured to be bendable so as to engage the reinforcing bulb of the associated grid runner.

8. The beam of claim 1 wherein each clip comprises: i) an intermediate portion defining the space between the reinforcing bulbs of the first and second grid runners, ii) upper and lower portions configured to engage the reinforcing bulbs of the first and second grid runners, iii) the clip being configured to be bendable about a central portion to bring the upper and lower portions into engagement with the reinforcing bulbs, and iv) a plurality of apertures configured to receive fasteners for securing the clip to the first and second grid runners.

9. A method for making a high strength I beam for use in a suspended ceiling grid comprising a plurality of grid runners, each grid runner having a reinforcing bulb having a height and a width, the reinforcing bulb being connected by an intermediate web to laterally-extending flanges so as to define a Tee shape, the method comprising:
   f) a)placing a first grid runner and a second grid runner in an aligned, vertical relationship, such that the reinforcing bulb of the first grid runner is adjacent to, but spaced apart from, the reinforcing bulb of the second grid runner and the intermediate webs of the first and second grid runners are substantially co-planar;
   g) b) securing one or more clips with fasteners to one or both of the reinforcing bulb and intermediate web of each of the first grid runner and the second grid runner to maintain the first and second grid runners in the aligned, vertical, spaced-apart relationship.

\* \* \* \* \*